A. DE VILBISS, Jr.
SCALE.
APPLICATION FILED AUG. 15, 1910.
1,122,222.
Patented Dec. 22, 1914.
2 SHEETS—SHEET 2.
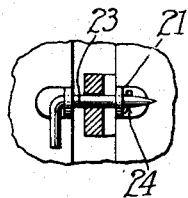
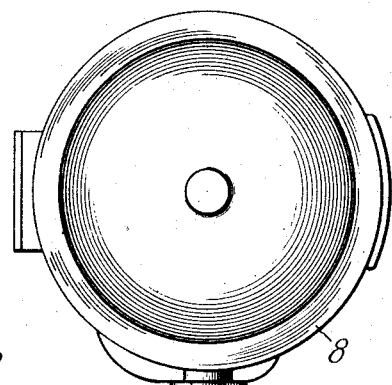
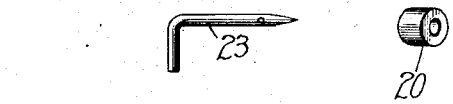
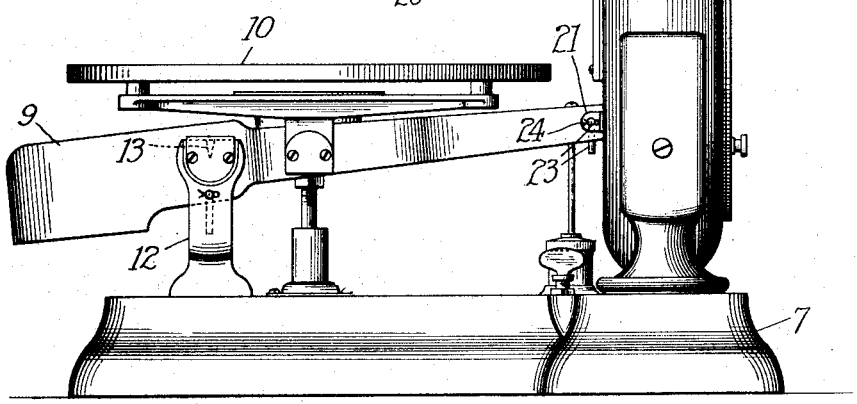
Witnesses
Martin H. Olsen.
Robert D. Obberman.
Inventor
Allen DeVilbiss Jr.
By Rector, Hibben, Davis & Macauley
Attys ved for blocking up the lever or beam and
UNITED STATES PATENT OFFICE.

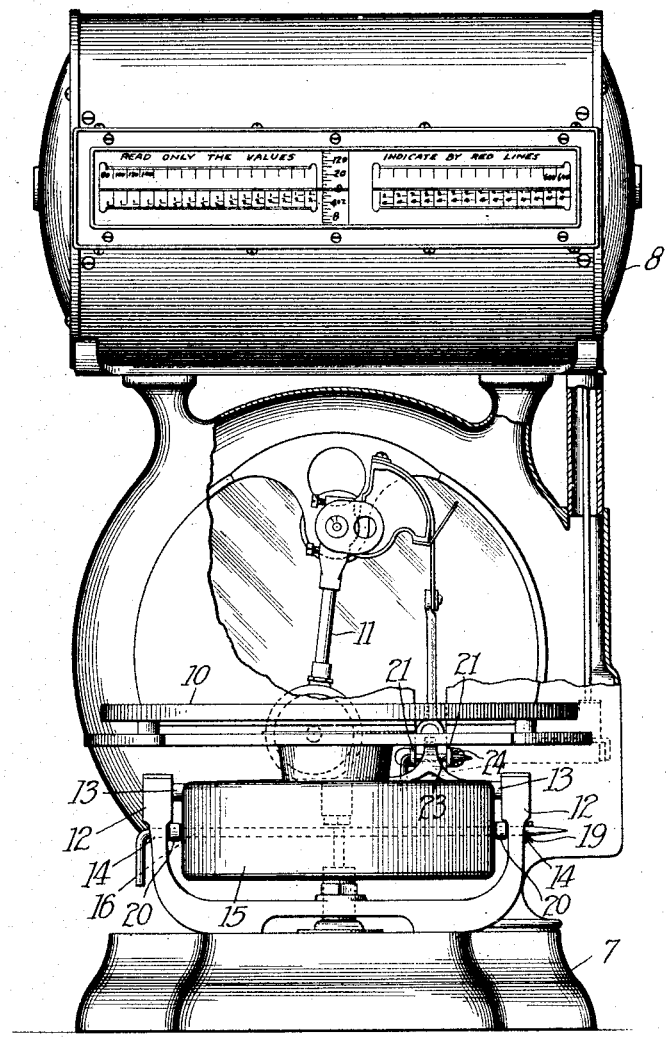

ALLEN DE VILBISS, JR., OF TOLEDO, OHIO; SHOLTO M. DOUGLAS, ADMINISTRATOR DE BONIS NON UPON ESTATE OF SAID DE VILBISS, JR., DECEASED, ASSIGNOR TO TOLEDO SCALE COMPANY, OF NEWARK, NEW JERSEY.

SCALE.

1,122,222.   Specification of Letters Patent.   Patented Dec. 22, 1914.

Application filed August 15, 1910. Serial No. 577,293.

*To all whom it may concern:*

Be it known that I, ALLEN DE VILBISS, Jr., a citizen of the United States, and a resident of Toledo, county of Lucas, State of Ohio, have invented certain new and useful Improvements in Scales, of which the following is a specification.

My invention relates more particularly to balance or beam scales in which the parts and more especially the bearings are necessarily more or less delicate where accuracy is required and therefore liable to injury during transportation. It is obviously desirable that the scales be packed for shipment as nearly as possible in a condition and relation of parts in which they are to be used, but whether shipped in assembled condition or otherwise the problem of packing to prevent injury is a serious one.

By my present invention means are provided for blocking up the lever or beam and securely locking it from movement, whereby the scales may be safely shipped with the beam and associated parts in substantially the position which they occupy in use.

In the accompanying drawings, a cylinder scale is shown with my improvements applied thereto, but it is obvious that they are equally applicable to other forms of scale in which a balanced beam is employed.

Figure 1 is a view in front elevation with parts of the casing broken away to show the interior mechanism; Fig. 2 is a view in side elevation and Figs. 3, 4, 5 and 6 are details the precise nature of which will be understood from the following description.

The base 7, indicating cylinder 8, beam 9 and platform 10 are all made of any usual or desirable form but since they are not claimed herein *per se* detailed description thereof is unnecessary. In Fig. 1 the counterbalancing pendulum 11 and its connections to the beam are shown but these details likewise are not concerned in the present invention. The beam is mounted on standards 12 which are provided with bearings of a suitable character for the knife edges 13 which may be of any usual or preferred form. Beneath the knife edges in the standards are registering perforations 14 14 which may be brought into registry with a similar perforation 15 in the beam by slightly raising the latter. In Fig. 4 is shown the pin or rod 16 which is adapted to fit loosely within the openings 14 15 when the latter are brought into registry. The pin 16 is provided with a bent portion 17 at right angles thereto and is tapered at the other end 18 to facilitate insertion in the perforations 14 15. The necessary elevation of the beam 9 is so slight that the taper on the pin 16 is sufficient to accomplish it when thrust into place. A cotter pin 19 secures the pin 15 from dislodgment and spacing sleeves 20 loose upon the rod 16 prevent sidewise movement of the beam. In order to prevent movement of the beam around the bearing or around the rod 16 I have provided an additional locking pin by which the nose of the beam is secured to the casing. For this purpose the latter is provided with perforated ears or lugs 21 shown in Figs. 1, 2 and 3, which are arranged on opposite sides of the opening through which the nose of the beam enters the casing 22. The beam is also bored at a point which may be brought into registry with the openings in the ears 21 and a pin 23 substantially like the pin 16 but shorter is inserted through the registering openings in the ears and beam and locked therein by a cotter pin 24 prior to shipment. In order to release the beam and put it in condition for service when the scale reaches its destination, it is only necessary to withdraw the pins 16 and 23.

What I claim is:

1. In a scale, a beam, and supports therefor, having perforations arranged to be brought into registry, and a locking rod for insertion in the perforations.

2. In a scale, a beam, and supports therefor, having perforations arranged to be brought into registry, and a locking rod for insertion in the perforations, the latter being so arranged that they are in alinement when the beam is lifted slightly from its bearings.

3. In a scale, a beam, and supports therefor, having perforations arranged to be brought into registry, a locking rod for insertion in the perforations, the latter being so arranged that they are in alinement when the beam is lifted slightly from its bearings, and means to secure the rod against displacement.

4. In a scale, a beam having a perforation in the nose thereof, lugs on the casing having openings arranged to register with the perforation in the scale beam, a rod for preventing movement of the scale beam, and means for securing the rod against dislodgment.

5. In a scale, a beam, and beam supports, each provided with perforations, a locking rod for insertion therein, the perforations being so arranged that they are in alinement when the beam is lifted slightly from its bearing, and spacers arranged on the rod between the beam and the bearing.

6. In a scale, a scale beam, a frame through which the nose of the beam extends, the beam and frame on each side thereof being perforated, the perforations being so placed that they may be brought into alinement, and a rod adapted to extend transversely through the perforations in the beam and frame to lock the former against accidental movement during shipment.

ALLEN DE VILBISS, Jr.

Witnesses:
ARTHUR STULL,
F. A. CROWLEY.

Copies of this patent may be obtained for five cents each, by addressing the "Commissioner of Patents, Washington, D. C."